United States Patent [19]

Bogdanović et al.

[11] Patent Number: 4,713,110
[45] Date of Patent: Dec. 15, 1987

[54] PROCESS FOR PREPARING FINELY DIVIDED METAL POWDERS

[75] Inventors: Borislav Bogdanović; Helmut Bönnemann, both of Mulheim, Fed. Rep. of Germany

[73] Assignee: Studiengesellschaft Kohle mbH, Mulheim, Fed. Rep. of Germany

[21] Appl. No.: 933,454

[22] Filed: Nov. 21, 1986

[30] Foreign Application Priority Data

Nov. 26, 1985 [DE] Fed. Rep. of Germany ....... 3541633

[51] Int. Cl.$^4$ ............................................... C22B 1/00
[52] U.S. Cl. .............................. 75/0.5 A; 75/0.5 AA
[58] Field of Search ....................... 75/0.5 A, 0.5 AA

[56] References Cited

U.S. PATENT DOCUMENTS 2,687,951  8/1954  Whaley ............................. 75/0.5 A Primary Examiner—Peter D. Rosenberg
Attorney, Agent, or Firm—Sprung Horn Kramer & Woods

[57] ABSTRACT

The invention relates to a process for preparing finely divided metal powders, which process is characterized in that metal salts are reacted with magnesium, to which a catalytic amount of anthracene and/or magnesium anthracene or of one of their derivatives has been added as an activator, in a solvent, and optionally in the presence of an inorganic support material.

12 Claims, No Drawings

PROCESS FOR PREPARING FINELY DIVIDED METAL POWDERS

The present invention relates to a process for preparing finely divided highly reactive metal powders by reduction of metal salts with specifically activated magnesium and the use of said powders, more specifically as catalysts for the generation of active $MgH_2$-Mg hydrogen storage systems.

The technically relevant methods for preparing finely divided metal particles having large specific surface areas—which particles have a high technical importance in powder metallurgy (Ullmanns Encykl. Techn. Chem., 4th Edition, Vol. 19, page 563) on the one hand, and as catalysts or for preparing catalysts (Ullmanns Encykl. Tech. Chem., 4th Edition, Vol. 13, page 517) on the other hand—, apart from the melt process, are the reduction of metal salts with hydrogen or other reducing agents in the presence of suitable supports, the thermal decomposition of metal carbonyls (Ni, Fe), the chemical conversion of metal alloys (Raney nickel) and the metal evaporation techniques.

One more recent method for the preparation of finest metal particles having extremely high chemical and catalytic reactivities is the reduction described by Rieke et al. of metal halides with alkali metals, more specifically with lithium, in solvatizing solvents such as tetrahydrofurane (THF) and Glyme, optionally in the presence of catalytic amounts of naphthalene {R. D. Rieke et al., *Organometallics* 1983, 2, 377; R. D. Rieke, Report 1984, Gov. Rep. Announce. Index (U.S.) 1985, 85 (9), 54}.

Under the aspects of commercial efficiency, nontoxic and non-hazardous handling and availability, magnesium appears to be particularly advantageous as a reducing agent for the preparation of metal powders from metal salts. However, its application to this purpose so far as been restricted to few examples, since the reaction of metal salts with magnesium in the presence or absence of a solvent as a rule proceeds extremely slowly, requires high reaction temperatures (such as, e.g., the Kroll process), is incomplete or hardly takes place at all.

The reduction of nickel halides using magnesium in THF or ethanol for preparing hydrogenation catalysts of the Raney nickel type was described recently {P. Mauret, P. Alphonse, *J. Org. Chem.* 47 (1982) 3322}. However, this procedure has the disadvantage that the reduction at a reasonable rate is possible only at elevated temperatures, i.e. in boiling THF or ethanol, in which reaction relatively coarse nickel particles are formed and that, on the other hand, the lower the reaction temperature, the finer are the metal particles.

Now it was surprisingly found that the addition of a catalytic amount of anthracene or of its alkyl or aryl derivatives and/or magnesium anthracene or its derivatives, respectively, to the magnesium provides a highly active and, at the same time, low-cost and easy-to-handle reducing agent which commercially efficiently enables metal salts to be reduced under mild conditions to give finest metal powders comparable to those obtainable according to Rieke et al. with the use of lithium.

For the preparation of metal powders by the process according to the invention first magnesium metal powder—preferably having a particle size $\leq 0.15$ mm—in a solvent—preferably THF—is admixed with anthracene in an amount of from 1 to 10 mole percent, and preferably from 2 to 6 mole percent. The addition of an alkyl halide such as ethyl bromide is advantageous, however not obligatory for the process according to the invention. After 1 to 5 hours there is obtained, besides a small amount of magnesium anthracene, a highly active magnesium which when suspended in, e.g., THF, but also as a dry powder, can be used for reducing metal salts to finest metal powder under mild conditions. According to one variant of the process according to the invention prefabricated magnesium anthracene is added as activator. Performing the activation in an ultrasonic bath favours the generation of a shining metal surface. According to the invention the metal salts are contacted with the magnesium/anthracene or magnesium/magnesium anthracene system at a temperature of from $-78°$ C. to $150°$ C., and preferably from $-30°$ C. to $+80°$ C., the reaction with evolution of heat and precipitation of the precipitate of fine metal particles being completed within from 1 to 30 hours, depending on the temperature and kind of the metal salt.

In the practice of the reaction it is important that in the course of the reaction of the magnesium with the involved metal salts anthrancene or magnesium anthracene or their derivatives act as catalysts for generating highly reactive Mg species. The omission of these activation catalysts results in a drastic deceleration and/or incomplete reduction of the starting material as is shown by comparative experiments. As is typical for a catalyst, the readily separable anthracene can be recovered from the batches and re-used.

As the metals of the metal salts there are preferably used the elements of the Groups IB, IIB, VIIB and VIIIB of the Periodic System, and as the metal salts or compounds there are preferably used those containing either inorganic or organic anions and, more preferably, those which will be solatized in the systems used as solvents such as halides, alcoholates and salts of organic acids. Examples of metals of the Groups IB, IIB, VIIB and VIIIB of the Periodic System are Cu, Ag, Au; Zn, Cd, Hg; Mn, Tc, Re; Fe, Co, Ni, Ru, Rh, Pd, Os, Ir, Pt.

The process according to the invention for the first time allows generally and with high efficiency to use the inexpensive safely-to-handle non-toxic magnesium for preparing fine metal powders having specific surface areas of from 6 to 100 $m^2/g$ by reduction of their metal salts.

The fine metal powders obtainable by the process according to the invention may be used as such or bonded to supports as heterogeneous catalysts. In order to prepare supported catalysts according to the present process it is preferred to effect the reduction of metal salts with magnesium in the presence of anthracene or magnesium anthracene or their derivatives and in the presence of the materials employed as inorganic supports such as $Al_2O_3$, $SiO_2$, MgO, zeolites or activated carbon. Therefrom systems result which have finest metal particles anchored to the surface thereof which systems may advantageously used as catalysts also in the absence of a solvent or suspending agent, e.g. as hydrogenation catalysts. A technically and commercially particularly important case of such catalyst systems are the active $MgH_2$-Mg storage systems obtainable in accordance with the present process (see page 8).

Reversible metal hydride-metal hydrogen storage systems more recently have gained technical importance as means for the safe pressureless storage of hydrogen at low weight and space requirements. Among the known metal hydride-metal storage systems under consideration as reversible hydrogen storage systems the MgH$_2$-Mg system is distinguished by the highest proportion by weight of reversibly bound hydrogen (7.6% by weight) and, hence, the highest energy density per unit weight of the storage material (2.3 kWh/kg).

Although, due to the reason set forth above as well as due to the relatively inexpensive magnesium, the MgH$_2$-Mg system appears to be an optimum hydrogen storage system for mobile applications, e.g. for hydrogen-propelled vehicles, as well as for high temperature storage elements for heat pumps, such applications were barred by the insatisfactory kinetics of this system. Thus, it has been known that pure magnesium can be hydrogenated only under drastic conditions and even then only very slowly and incompletely. The dehydrogenation rate of the magnesium hydride thus prepared is also not acceptable for a hydrogen storage element. Therefore, during the last 10 to 15 years many attempts were made to improve the hydrogenability of the magnesium by doping or alloying same with alien metals or intermetallic compounds, respectively {literature review: B. Bogdanovic, Angew. Chem. 97 (1985) 253; Angew. Chem. Int. Ed. Engl. 24 (1985) 262}. Although via this route some improvements with respect to the kinetics could be accomplished, some essential disadvantages of such systems have not yet been eliminated. Thus, the first hydrogenations of the magnesium doped with the alien metal or the intermetallic compound still require drastic reaction conditions to be employed, and only after several hydrogenation/dehydrogenation cycles the kinetics of these systems become satisfactory, and content of reversible hydrogen becomes higher. For an improvement of the kinetic properties considerable proportions of the alien metal or of the expensive intermetallic compound are necessary. In addition, the storage capacity of these systems in general is much below the value to be theoretically expected for MgH$_2$.

An essential progress with respect to the kinetics and storage capacity of the MgH$_2$-Mg systems was achieved by the process described in the European Patent Specification No. 0 003 564 (Studiengesellschaft Kohle mbH) for the homogeneously-catalytic hydrogenation of magnesium, wherein magnesium is reacted with hydrogen in the presence of a catalyst consisting of a halide of a metal of the Subgroups IV to VIII of the Periodic System and of an organomagnesium compound or a magnesium hydride and in the presence of a polycyclic aromatic or a tertiary amine and optionally in the presence of a magnesium halide MgX$_2$ wherein X=Cl, Br, I.

The advantages of the above process, apart from the mild reaction conditions in the first hydrogenation of the magnesium, above all reside in the superior kinetics of the system thus obtainable in the subsequent dehydrogenation/hydrogenation cycles. This is, inter alia, shown by that loading magnesium with hydrogen in subsequent dehydrogenation/hydrogenation cycles is possible already without pressurization at all or only under a slightly elevated pressure and at lower temperatures than in the known systems of this type (e.g. in the Mg-Mg$_2$Ni system). The storage capacity of the MgH$_2$-Mg systems obtainable via homogenous catalysis is close to the theoretical value.

A further process for preparing active MgH$_2$-Mg hydrogen-storing systems, described in the German Published Unexamined Patent Application (DE-OS) 32 47 360 (Studiengesellschaft Kohle mbH) consists of that magnesium hydride or metallic magnesium in a finely divided form is doped by contact with a solution of a suitable transition metal complex or a suitable transition metal-organic compound. In said process the respective transition metal is deposited in an extremely fine distribution on the surface of the magnesium hydride or magnesium particles and acts as the catalyst in dehydrogenation and hydrogenation processes. A particular advantage of this process resides in that already small amounts of the coated transition metals directly or after a few dehydrogenation-hydrogenation cycles causes a strong catalytic effect to occur and that this catalytic effect is retained in continued dehydrogenation-hydrogenation. In general a proportion of 3% by weight of the respective transition metal, based on magnesium hydride or magnesium, is sufficient for generating the desired catalytic effect. Thus, the H$_2$ storage capacity of the system thus obtainable is relatively high.

As the preferred transition metal complexes or transition metal-organic compounds to be employed in said process there are considered complexes or organometal compounds of nickel, palladium and iron.

Now, the present process for producing active MgH$_2$-Mg hydrogen storage systems consists of that transition metal salts are reduced with magnesium in a suitable solvent—preferably THF—in the presence of a large excess of the metallic magnesium present in a finely divided form and of a catalytic amount of anthracene or magnesium anthracene or their derivatives. The transition metals precipitated in a finest form then remain adhered to the surface of the magnesium particles present in an excess amount and act as catalysts in the following hydrogenation-dehydrogenation processes. Nickel in the form of its halides, acetylacetonate or alcoholate is considered to be the preferred transition metal in the present process. As the preferred form of metallic magnesium there is considered a magnesium powder having a particle size of $\leq 0.05$ mm (270 mesh).

The present process is proposed as an alternative process to the process for preparing active MgH$_2$-Mg hydrogen storage systems according to the DE-OS 32 47 360 with the advantage that for the doping step, instead of the transition metal complexes or the transition metal-organic compounds, the transition metal salts may be used which in general are more readily available and less expensive.

The kinetics of the hydrogen storage materials doped with nickel and prepared according to the present process are comparable to the corresponding materials prepared according to the DE-OS 32 47 360, and the hydrogen storage capacities are the same or somewhat higher.

The invention is illustrated in greater detail by, but not limited to, the following EXAMPLES.

The experiments were carried out in an argon atmosphere; the pre-dried THF was distilled over diethyl magnesium.

EXAMPLE 1

To a suspension of 0.49 g (20 mmol) of Mg powder (50 mesh) in 200 ml of THF there were added 0.36 g (2 mmol) of anthracene and 2 drops of ethyl bromide, and the mixture was stirred at room temperature until the orange magnesium anthracene precipitated (for 2 to 5 hours). 2.60 g (20 mmol) of anhydrous NiCl$_2$ were then added, the batch was stirred at room temperature for 28 hours, the black precipitate was collected by filtration, washed three to five times with THF and dried in vacuo ($10^{-3}$ Torr). There were obtained 1.56 g of a black pyrophoric powder having the composition:

Ni 78.9; Mg 2.7; C 12.5; H 1.3 and Cl 1.1%. The specific surface area of the powder (BET method) was 7.2 m²/g.

EXAMPLES 2 TO 8

The EXAMPLES 2 to 8 were carried out on the analogy of EXAMPLE 1. All data of the experiments of the EXAMPLES 1 to 8 are set forth in Table 1.

TABLE 1

Reduction of metal salts $MX_n$ with anthracene-activated magnesium at room temperature in THF to form finely divided metal powders M*

| EXAMPLE No. | $MX_n$ | g/mmol | $Mg^{(a)}$ g/mmol | Anthracene g/mmol | THF ml | React. Time h | M* g | \multicolumn{5}{c}{Composition in %} | Specific surface area m²/g |
|---|---|---|---|---|---|---|---|---|---|---|---|---|---|
| | | | | | | | | M | Mg | C | H | X | |
| 1 | $NiCl_2$ | 2.60/20 | 0.49/20 | 0.36/2 | 200 | 28 | 1.56 | 78.9 | 2.7 | 12.5 | 1.3 | 1.1 | 7.2 |
| 2 | $CoCl_2$ | 5.19/40 | 0.97/40 | 0.18/1 | 200 | 10 | | 86.6 | 3.7 | 7.0 | 0.8 | 3.5 | 57.3 |
| 3 | $FeCl_2.2$ THF | 8.52/40 | 0.97/40 | 0.18/1 | 200 | 26 | | 73.9 | 3.7 | 7.7 | 1.1 | 0.4 | 96.2 |
| 4 | $PdCl_2$ | 8.85/50 | 1.20/50 | 0.55/3 | 400 | 6 | 5.33 | 90.6 | 6.8 | — | — | 1.7 | 57.6 |
| 5 | CuCl | 9.9/100 | 1.2/50 | 1.1/6 | 400 | 8 | 5.90 | 97.7 | 0.3 | — | — | 1.6 | 6.0 |
| 6 | $ZnCl_2$ | 13.6/100 | 2.4/100 | 1.1/6 | 500 | 5 | 6.15 | 97.1 | 0.7 | — | — | 2.1 | 8.1 |
| 7 | CuBr | 14.4/100 | 1.2/50 | 0.55/3 | 300 | 5 | 6.10 | 94.6 | 0.4 | 1.3 | 0.4 | 4.2 | 6.6 |
| 8 | $Feacac_3^{(b)}$ | 11.8/33.3 | 1.2/50 | 0.55/3 | 300 | 0.5 | 1.0 | 74.7 | 10.9 | 9.4 | 1.2 | | 96.2 |

(a) Mg powder 50 mesh;
(b) Fe acetylacetonate

EXAMPLE 9

To a suspension of 50.0 g (2.06 mol) of magnesium powder (50 mesh) in 130 ml of THF there were added 0.23 g (1.3 mmol) of anthracene and 2 drops of ethyl bromide, and the mixture was stirred at until the magnesium anthracene precipitated (about 5 hours). Then 3.41 g (26.3 mmol) of anhydrous $NiCl_2$ were added to the suspension, the batch was stirred for 20 hours, the Mg powder was separated from the solution by filtration, washed with THF and dried under high vacuum. There were obtained 49.4 g of the air-stable Mg powder doped with 1.3% by weight of nickel. 16.6 g of said powder were subjected to a series of 55 hydrogenation-dehydrogenation cycles in a completely automatic electronically controlled apparatus (B. Bogdanovic, loc. cit., page 5–6), while the hydrogenation pressure and temperature were varied. During these cycles the $H_2$ capacity and the kinetics of the storing material remained constant. The reversible hydrogen contents of the sample was 3.67% by weight.

EXAMPLE 10

The experiment was carried out in the same manner and with the same molar amounts as in EXAMPLE 9, except that Mg powder of 270 mesh was employed in the place of 50 mesh Mg powder. There were obtained 48.0 g of the air-stable Mg powder doped with nickel having the composition:

Mg 97.4; Ni 1.0; C 0.6; H 0.7 and Cl 0.2%.

15.1 g of said powder were subjected to a series of 28 hydrogenation-dehydogenation cycles as in EXAMPLE 9 with variation of the hydrogenation pressure and temperature. During these cycles the $H_2$ capacity and the kinetics of the storing material remained constant. The sample contained 7% by weight of the reversibly bound hydrogen.

We claim:

1. A process for preparing a finely divided metal powder, comprising reacting a salt of such metal with magnesium, in the presence of a solvent and a catalytic amount of a material selected from the group consisting of an anthracene, a magnesium anthracene, and a mixture of an anthracene and a magnesium anthracene.

2. A process according to claim 1, wherein the magnesium is treated with a catalytic amount of at least one of an anthracene and a magnesium anthracene in an ultrasonic bath.

3. A process according to claim 1, wherein the metal of the metal salt is from Group IB, IIB, VIIB or VIIIB of the Periodic System.

4. A process according to claim 1, wherein tetrahydrofurane is employed as the solvent.

5. A process according to claim 1, wherein the catalyst is anthracene per se, an alkyl or aryl anthracene, magnesium anthracene or a magnesium alkyl or aryl anthracene.

6. A process according to claim 5, wherein the process is effected in the presence of an inorganic support material, the metal from the reduction depositing on the support material.

7. A process according to claim 6, wherein $SiO_2$, $Al_2O_3$, MgO or activated carbon is used as the inorganic support material.

8. A process according to claim 6, wherein finely divided metallic magnesium is used as the inorganic support material, the resulting product being a metal-doped magnesium.

9. A process according to claim 1, wherein the magnesium is a powder having a particle size of $\leq 0.3$ mm (50 mesh).

10. A process according to claim 1, wherein the magnesium is a powder having a particle size of $\leq 0.05$ mm (270 mesh).

11. A process according to claim 1, wherein the metal of the metal salt is Ni, Co, Pt, Pd, Cr or Fe.

12. A process according to claim 1, wherein the metal salt is a nickel halide.

* * * * *